US008468378B2

(12) United States Patent
Park

(10) Patent No.: US 8,468,378 B2
(45) Date of Patent: *Jun. 18, 2013

(54) INTERFACE CARD, NETWORK DEVICE HAVING THE SAME AND CONTROL METHOD THEREOF

(75) Inventor: Hyun-wook Park, Gwacheon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,490

(22) Filed: Feb. 14, 2011

(65) Prior Publication Data

US 2011/0138201 A1    Jun. 9, 2011

Related U.S. Application Data

(63) Continuation of application No. 11/776,725, filed on Jul. 12, 2007, now Pat. No. 7,908,502.

(30) Foreign Application Priority Data

Aug. 3, 2006 (KR) .................................. 2006-73502

(51) Int. Cl.
*G06F 1/32* (2006.01)
(52) U.S. Cl.
USPC ............................ 713/324; 713/320; 713/323
(58) Field of Classification Search
USPC ................. 713/300, 310, 320, 321, 322, 323, 713/324
See application file for complete search history.

(56) References Cited

U.S. PATENT DOCUMENTS

| 5,802,305 A | 9/1998 | McKaughan et al. |
| 6,681,244 B1 * | 1/2004 | Cross et al. .................... 709/203 |
| 6,694,360 B1 * | 2/2004 | Duguay et al. ................ 709/220 |

(Continued)

FOREIGN PATENT DOCUMENTS

| EP | 0657846 A2 | 6/1995 |
| JP | 2001-191616 | 7/2001 |

(Continued)

OTHER PUBLICATIONS

European Search Report dated Nov. 22, 2007 issued in EP 07113305.2.

(Continued)

*Primary Examiner* — Dennis M Butler
(74) *Attorney, Agent, or Firm* — Stanzione & Kim, LLP

(57) ABSTRACT

An interface card is capable of communicating with an external device and includes a power supplier; a non-volatile memory which stores executable instructions to operate in an active-mode and a sleep-mode; a small-capacity volatile memory which is supplied with power in the sleep mode; a transmitter-receiver which transmits and receives packet data to/from the external device; and a controller which retrieves sleep-mode instructions stored in the non-volatile memory and loads the sleep mode instructions in the small-capacity volatile memory to transition the interface card into the sleep mode if the transmitter-receiver does not receive the packet data for predetermined time period in an active mode. The interface card processes certain packet data in the sleep mode and transitions back into the active mode when sleep mode operations determine that the packet data cannot be processed in the sleep mode. The non-volatile memory, and other components of an external circuit, is powered down when the interface card is in the sleep mode.

8 Claims, 6 Drawing Sheets

U.S. PATENT DOCUMENTS

| | | | |
|---|---|---|---|
| 6,782,483 B2 * | 8/2004 | Oshima et al. | 713/322 |
| 7,908,502 B2 * | 3/2011 | Park | 713/324 |
| 2001/0052034 A1 | 12/2001 | Takimoto | |
| 2003/0196137 A1 | 10/2003 | Ahmad et al. | |
| 2004/0034803 A1 | 2/2004 | Hamilton | |
| 2005/0007628 A1 * | 1/2005 | Yamano et al. | 358/1.15 |
| 2005/0108585 A1 | 5/2005 | Yang | |
| 2005/0128515 A1 * | 6/2005 | Ohno | 358/1.15 |
| 2006/0265473 A1 * | 11/2006 | Muto | 709/218 |

FOREIGN PATENT DOCUMENTS

| | | |
|---|---|---|
| JP | 2004-86912 | 3/2004 |
| KR | 2004-70096 | 8/2004 |
| KR | 2006-0012287 | 2/2006 |
| WO | 2004/099961 | 11/2004 |

OTHER PUBLICATIONS

European Office Action 10 187 578.9 issued date Feb. 14, 2011.
Korean Notice of Allowance issued Mar. 22, 2010 in KR Application No. 10-2006-0073502.
European Search Report dated Jan. 31, 2008 issued in EP 07113305.2.
EP Office Action issued Oct. 25, 2011 in EP Application No. 10 187 621.7.
EP Office Action issued Oct. 31, 2011 in EP Application No. 10 187 578.9.
EP Search Report issued Nov. 24, 2010 in EP 10 187 578.9.
EP Search Report issued Nov. 25, 2010 in EP 10 187 621.7.
KR Office Action issued Sep. 23, 2009 in KR Patent Application No. 10-2006-0073502.
U.S. Office Action issued Aug. 2, 2010 in U.S. Appl. No. 11/776,725.
European Office Action Issued on Jun. 18, 2012 in EP Patent Application No. 10187578.9.
European Office Action Issued on Jun. 18, 2012 in EP Patent Application No. 10187621.7.

* cited by examiner

INTERFACE CARD, NETWORK DEVICE HAVING THE SAME AND CONTROL METHOD THEREOF

CROSS-REFERENCE TO RELATED APPLICATIONS

This application is a continuation of prior art application Ser. No. 11/776,725, filed Jul. 12, 2007 now U.S. Pat. No. 7,908,502 in the U.S. Patent and Trademark Office, which claims priority from Korean Patent Application No. 10-2006-0073502, filed on Aug. 3, 2006, in the Korean Intellectual Property Office, the entire content of which is incorporated herein by reference in its entirety.

BACKGROUND OF THE INVENTION

1. Field of the Invention

The present general inventive concept described herein through illustrative embodiments thereof relates to an interface card, a network device having the same and a control method thereof, and more particularly, to an interface card which is capable of sending and receiving data over a network in both a sleep mode and an active mode, a network device having the same and a control method thereof.

2. Description of the Related Art

Certain electronic devices have an "active" operational mode in which normal operations are performed and a "sleep" mode in which standby operations are performed, which consume less power than the normal operations executed in the active mode. Such an electronic device is an interface card of a network device, which is connected to a network such as an Ethernet compliant network or the like. Usually, such interface cards are provided with a driving power, even during the sleep mode, so that the device may respond to requests from external network devices.

FIG. 1 is a block diagram to illustrate a configuration of a typical interface card of a conventional network device. The interface card 100 for the network device includes a central processing unit (CPU) 112 and an Ethernet controller 114, which are provided as a system on chip (SOC) 110, a non-volatile memory 120, a volatile memory 122 and a transmitter-receiver 124.

The transmitter-receiver 124 receives packet data from an external network device and outputs the packet data to the Ethernet controller 114. The Ethernet controller 114 processes the input packet data and stores the packet data in the volatile memory 122. The CPU 112 processes the packet data stored in the volatile memory 122 via a software protocol stack configured in accordance with the applicable network protocol, such as a transmission control protocol (TCP), an Internet protocol (IP) or the like.

In the configuration where the CPU 112 and the Ethernet controller 114 are provided in a single unit of SOC 110, however, power is provided to the entire circuit all the time. That is, power is continuously supplied to the CPU 112, the Ethernet controller 114, the non-volatile memory 120, the volatile memory 122 and the transmitter-receiver 124 regardless of whether the network device is in the active mode or the sleep mode. Consequently, power is unnecessarily consumed by the non-volatile memory 120 and the volatile memory 122 during standby operations of the interface card.

SUMMARY OF THE INVENTION

The present general inventive concept to provides an interface card which is capable of reducing power consumption in a sleep mode, a network device having the same and a control method thereof.

The present general inventive concept also provides an interface card which is capable of processing packet data in a sleep mode, a network device having the same and a control method thereof.

Additional aspects and utilities of the present general inventive concept will be set forth in part in the description which follows and, in part, will be apparent from the description, or may be learned by practice of the general inventive concept.

The foregoing and/or other aspects and utilities of the general inventive concept are achieved by providing an interface card to communicate with an external device, the interface card comprising a power supplier, a non-volatile memory system to store processor-executable instructions for active mode operations and to store processor-executable instructions for sleep-mode operations, a first volatile memory to be supplied with power in a sleep mode, a transmitter-receiver to transmit packet data to and receive packet data from the external device, and a controller to load the sleep-mode instructions stored in the non-volatile memory into the first volatile memory and to transition the interface card into the sleep mode responsive to the transmitter-receiver not receiving the packet data for a predetermined time during the active-mode operations, the controller to execute only the instructions for the sleep-mode operations stored in the first volatile memory upon completing the transition into the sleep mode.

The foregoing and/or other aspects and utilities of the general inventive concept are also achieved by providing a network printer that includes a printing engine, and an interface card to communicate with an external device, the interface card comprising a power supplier, a first volatile memory, a non-volatile memory having processor-executable instructions stored therein to form active-mode firmware and sleep-mode firmware, a transmitter-receiver which transmits packet data to and receives packet data from the external device, and a controller which loads instruction code of the sleep-mode firmware from the non-volatile memory into the first volatile memory and controls the power supplier to block power to the non-volatile memory, the controller further transitions the interface card into the sleep mode if the transmitter-receiver does not receive packet data in an active mode for a predetermined time.

The foregoing and/or other aspects and utilities of the general inventive concept are also achieved by providing a control method of a network printer selectively operable into an active mode and a sleep mode that consumes less power than in the active mode, the network printer communicating with an external device over a communication network, the method comprising receiving packet data in the active mode from the external device, transitioning the network printer into the sleep mode if the packet data are not received for a predetermined time, and receiving the packet data in the sleep mode from the external device and determining whether the packet data can be processed in the sleep mode.

The foregoing and/or other aspects and utilities of the general inventive concept are also achieved by providing a control method of an interface card, where the interface card comprises a non-volatile memory which stores processor-executable instructions for operating in an active mode and processor-executable instructions for operating in a sleep mode, the method comprising receiving packet data from an external device, and loading the sleep mode instructions from the non-volatile memory into a first volatile memory and removing power supplied to the non-volatile memory if the packet data are not received for a predetermined time in the active mode.

The foregoing and/or other aspects and utilities of the general inventive concept are also achieved by providing a network interface system comprising an interface circuit to execute processing instructions responsive to receipt of any of a set of data packets, and an external circuit coupled to the interface circuit to provide thereto other processing instructions executable thereby responsive to a determination that a data packet outside the set of data packets has been received by the interface circuit.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
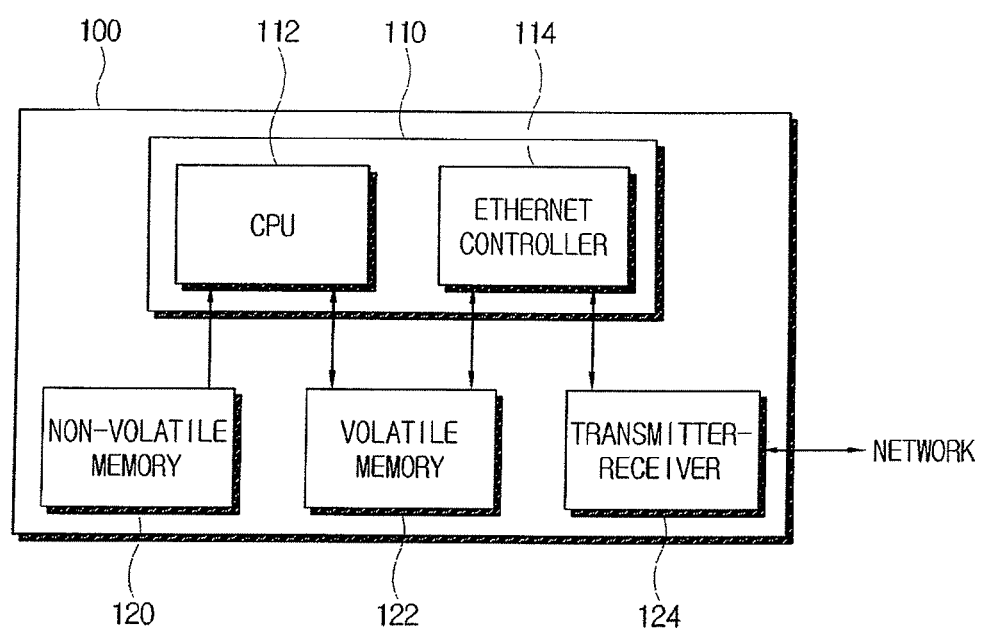
FIG. 1 is a block diagram to illustrate a configuration of a conventional interface card.

Reference will now be made in detail to the exemplary embodiments of the present general inventive concept, examples of which are illustrated in the accompanying drawings, wherein like reference numerals refer to like elements throughout. The descriptions below are provided to illustrate through exemplary embodiments of the present general inventive concept how such may be practiced. Such descriptions are not intended to limit the inventive concept to the exemplary embodiments described.

Figure 2:
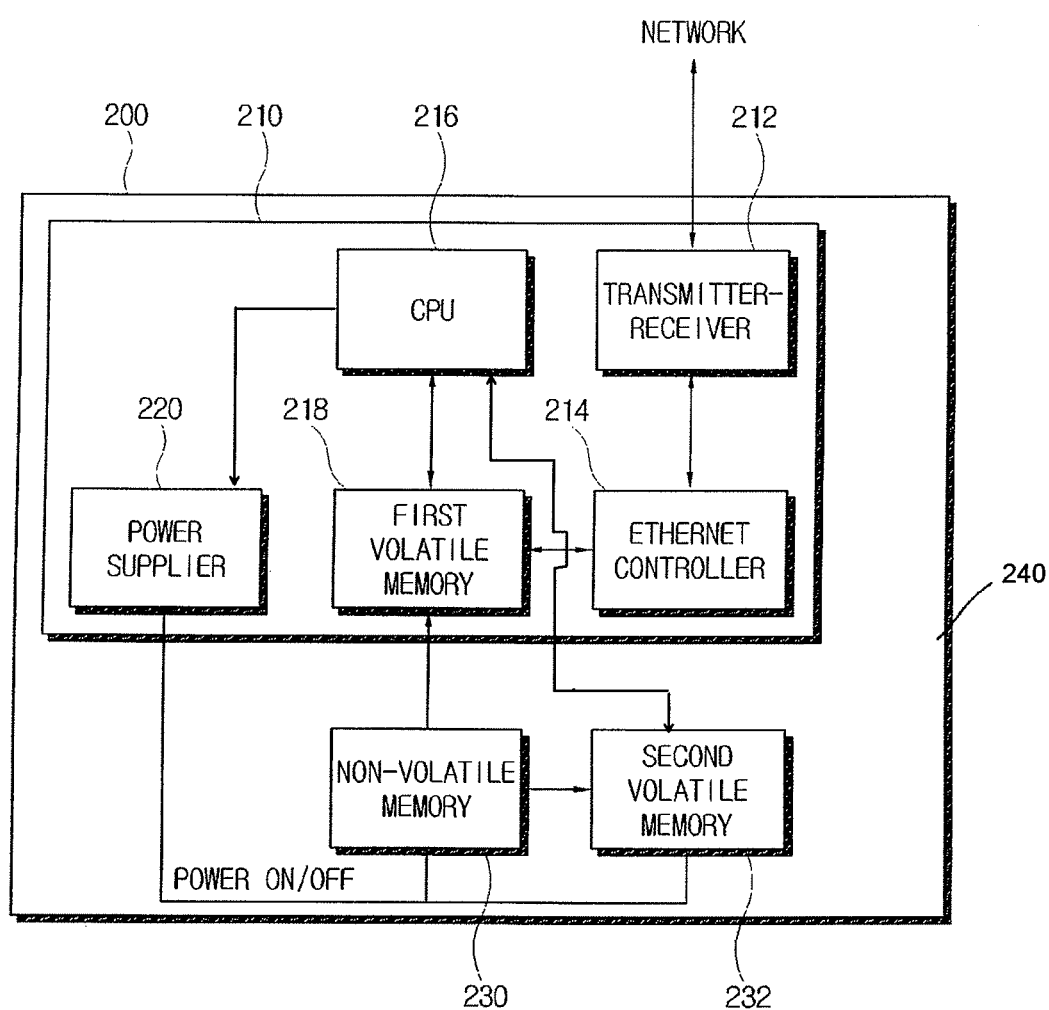
FIG. 2 is a block diagram to illustrate a configuration of an interface card according to an exemplary embodiment of the present general inventive concept.

Referring to FIG. 2, there is shown an interface card 200 of a network device, such as a network printer, according to an exemplary embodiment of the present invention. The exemplary interface card 200 includes a transmitter-receiver 212, an Ethernet controller 214, a CPU 216, a first volatile memory 218, a power supplier 220, a non-volatile memory 230 and a second volatile memory 22. It is to be understood that, while the exemplary configuration illustrated and described is directed to an Ethernet network configuration, the present inventive concept is not limited thereto, and other network protocols are intended to fall within the spirit and scope of the present general inventive concept.

In certain embodiments of the general inventive concept, the transmitter-receiver 212, the Ethernet controller 214, the CPU 216, the first volatile memory 218 and the power supplier 220 form an interface circuit and may be provided as an SOC 210. The non-volatile memory 230 and the second volatile memory 232 may be provided as part of an external circuit 240.

The first volatile memory 218 mounted in the interface circuit SOC 210 may be a small-capacity volatile memory system having enough capacity to store data and a set of processor-executable instructions to perform certain standby operations, and the second volatile memory 232 mounted in the external circuit 240 may be a large-capacity volatile memory system having enough capacity to meet the memory requirements of the interface card 200 during normal active mode operations. However, other memory configurations are practicable in accordance with the general inventive concept so as to meet the requirements of the specific implementation thereof.

The transmitter-receiver 212 implements a network physical layer and, as such, receives the packet data provided from the external device via the network and outputs the packet data to the Ethernet controller 214, which may implement a network data link layer.

The Ethernet controller 214 processes the input packet data and stores it in the first volatile memory 218. The CPU 216 processes the packet data stored in the first volatile memory 218 via a software protocol stack of the network protocol, such as through a transmission control protocol/Internet protocol (TCP/IP) compliant stack or the like.

In FIG. 2, the CPU 216 and the Ethernet controller 214 are described herein as separate functional components performing various separate operations of the interface card 200. However, the CPU 216 and the Ethernet controller 214 may be combined to form an interface card controller, and the term "controller," when used herein, refers to the combined functionality of the CPU 216 and the Ethernet controller 214, regardless of whether the components are physically combined.

The power supplier 220 supplies or controls a driving power to the external circuit 240, including the non-volatile memory 230 and the second volatile memory 232, depending on the operational mode of the interface card 200. The power supplier 220 may be a self-contained power supply deriving power from a bus (not illustrated) to which the interface card 210 is connected, or may be a switching device selectively applying power, such as from the bus (not shown), when the active mode is in effect.

The non-volatile memory 230 and the processor-executable instructions stored therein form active-mode firmware and sleep-mode firmware in that the non-volatile memory 230 stores executable instructions for both active mode operation and sleep mode operation. The non-volatile memory 230 may be implemented through any non-volatile storage system, such as a read-only memory (ROM) or a flash memory.

Active-mode firmware may include processor code to execute network interface operations in the active mode, e.g., processing packet data, such as printing packet data, in a network device, such as a network printer. The active-mode firmware may include a scheduler module that ascertains whether the transmitter-receiver 214 has received any packet data within a predetermined time period.

Sleep-mode firmware may include processor code to execute network interface operations in the sleep mode through processes loaded into the first volatile memory 218 of the interface circuit SOC 210. In certain embodiments of the present general inventive concept, the sleep-mode firmware is compact firmware without an operation system (OS).

The sleep-mode firmware may include a packet analyzing module to analyze whether the packet data received by the transmitter-receiver 214 contains a protocol-compliant payload that can be processed in the sleep mode, a protocol module to process the packet data in the sleep mode, and an active mode converting module to transition the network card 200 from the sleep mode to the active mode so that the packet data may be processed in the active mode responsive to a result of analysis by the packet analyzing module.

Figure 3:
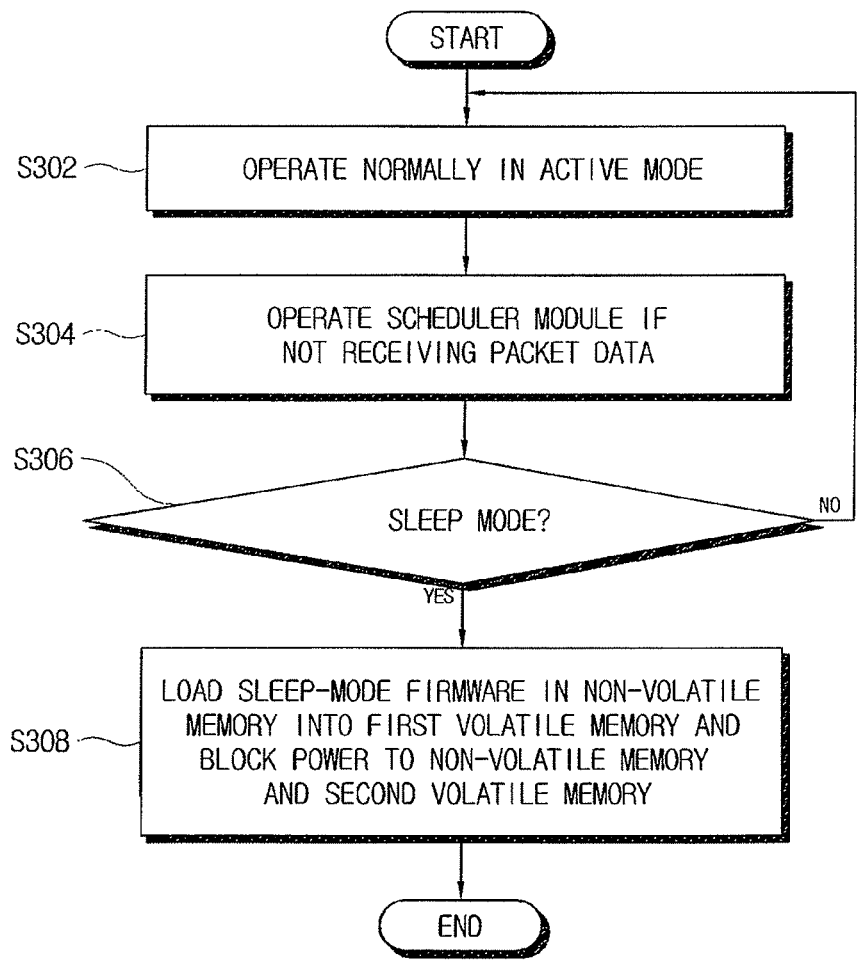
FIG. 3 is a flow chart to illustrate transition into a sleep mode according to the exemplary embodiment of the present general inventive concept.

Referring to FIGS. 2 and 3, operation of the exemplary interface card 200 in the active mode will be described.

As indicated above, the active mode is an operational mode where the interface card 200 operates to its full capability. In the active mode, the driving power is supplied to the non-volatile memory 230 and the second volatile memory 232 in the external circuit 240 by the power supplier 220. In the active mode, all the components of the exemplary interface card 200 are powered up and are operational. Upon transition into the active mode, the instructions of the active-mode firmware stored in the non-volatile memory 230 are loaded into the second volatile memory 232 and are executed by the CPU 216 therefrom. The interface card 200, then, operates normally in accordance with the active-mode firmware (operation S302).

The transmitter-receiver 212 receives packets of data from an external device connected to the network and outputs the packet data to the Ethernet controller 214. The Ethernet controller 214 processes the input packet data, such as to execute media access control for the interface card 200, and forwards the relevant data to the first volatile memory 218. The CPU 216 processes the packet data stored in the first volatile memory 218 in accordance with the software protocol stack, such as the TCP/IP compliant protocol stack.

If the transmitter-receiver 212 does not receive packet data for some time, the scheduler module is activated (operation S304). In certain embodiments of the present general inventive concept, the scheduler module may transition the interface card 200 into the sleep mode after a predetermined time has elapsed since its instantiation, and/or may determine if the sleep mode has been activated through some other mechanism, such as through a user command received in a properly formatted data packet. Then, if after a predetermined time period it is determined that the interface card 200 is to be in the sleep mode (operation S306), the interface card 200 retrieves the sleep-mode instruction code from the non-volatile memory 230 and loads the code into the first volatile memory 218, removes the driving power supplied by the power supplier 220 to the external circuit 240, e.g., the non-volatile memory 230 and the second volatile memory 232, and transfers control of the CPU 216 to the sleep-mode firmware in order to complete the transition into the sleep mode (operation S302).

However, if it is determined that the interface card 200 is not to be in the sleep mode (operation S306), the interface card 210 continues to operate normally in the active mode (operation S302).

Figure 4:
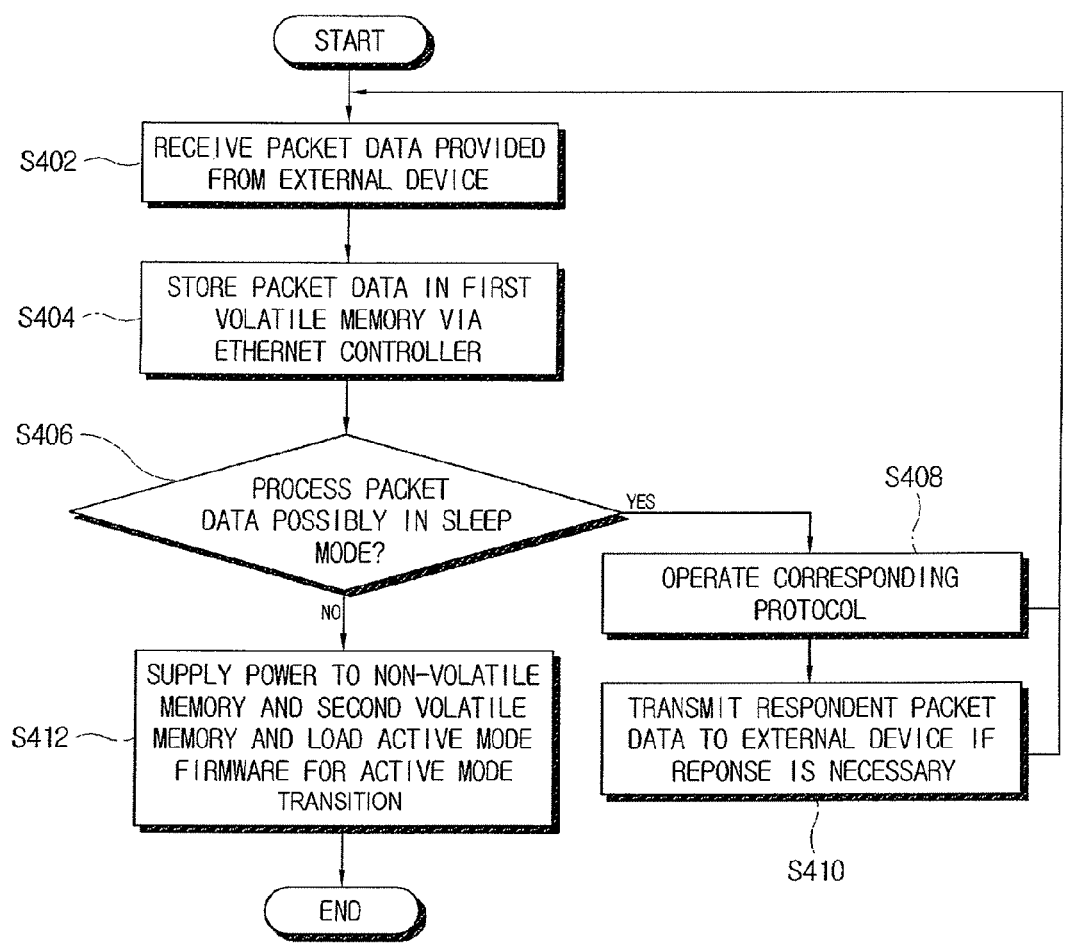
FIG. 4 is a flow chart illustrating the processing of packet data in the sleep mode according to the exemplary embodiment of the present general inventive concept.

Referring to FIGS. 2 and 4, operation of the interface card 200 in the sleep mode will now be described.

The sleep mode, as indicated above, is the operational mode where minimum power consumption is required and, as such, operations are confined to minimal processes, such as those that inform external devices that the interface card 200 is in standby in response to discovery packet data, such as broadcast packet data, multicast packet data or the like.

The transmitter-receiver 212 receives packet data provided from the external device connected to the network (operation S402) and outputs the packet data to the Ethernet controller 214. The Ethernet controller 214 processes the input packet data and stores the processed packet data in a data portion of the first volatile memory 218 (portion S404).

In certain embodiments of the present general inventive concept, the CPU 216 executes the packet analyzing module stored in the first volatile memory 218 to analyze what types of packet data are received and determines whether it is possible to process the packet data in the sleep mode (operation S406). The present general inventive concept does not limit the types of packet data that can be processed in the sleep mode, where such limitation is determined primarily by the size of the first volatile memory 218, the size of the code necessary to process any given packet data type, and the adopted standards defining acceptable behavior in a given operational mode.

If it is determined that the packet data can be processed in the sleep mode, the CPU 216 operates a corresponding protocol module stored in the first volatile memory 218 and the protocol module analyzes the packet data to execute a corresponding procedure (operation S408). Further, if it is required to respond to the external device that provided the packet data, the CPU 216 generates respondent packet data and transmits a suitably formatted packet containing the response (operation S410).

However, if the packet data cannot be processed in the sleep mode, the CPU 216 executes the active mode converting module stored in the first volatile memory 218 to transition the interface card 210 from the sleep mode to the active mode (operation S412). For example, if the present general inventive concept is implemented in a network printer and the packet data from the external device is printing packet data, the CPU 216 transitions the interface card 210 into the active mode and processes the printing packet data to be printed. Accordingly, the driving power would be supplied to the non-volatile memory 230 and the second volatile memory 232 through the power supplier 220, the active mode code would then be loaded from the non-volatile memory 230 into the second volatile memory 232, and the control of the CPU 216 would be transferred to the active mode instructions. In certain embodiments of the present general inventive concept, the printing packet is maintained in the first volatile memory 218 throughout the transition into the active mode, at which time the active mode instructions stored in the second volatile memory 232 are executed to process the printing packet data.

Figure 5A:
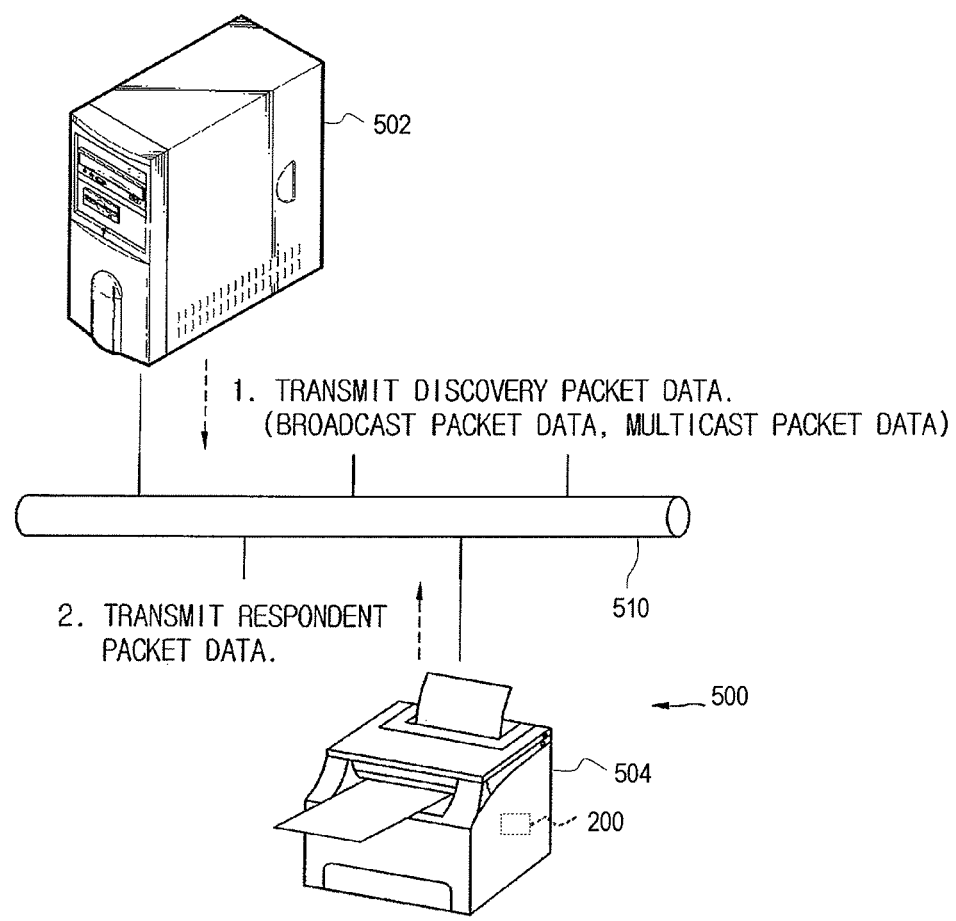
FIGS. 5A and 5B are block diagrams to illustrate operation of a network printer which employs the interface card according to the exemplary embodiment of the present general inventive concept.
Figure 5B:
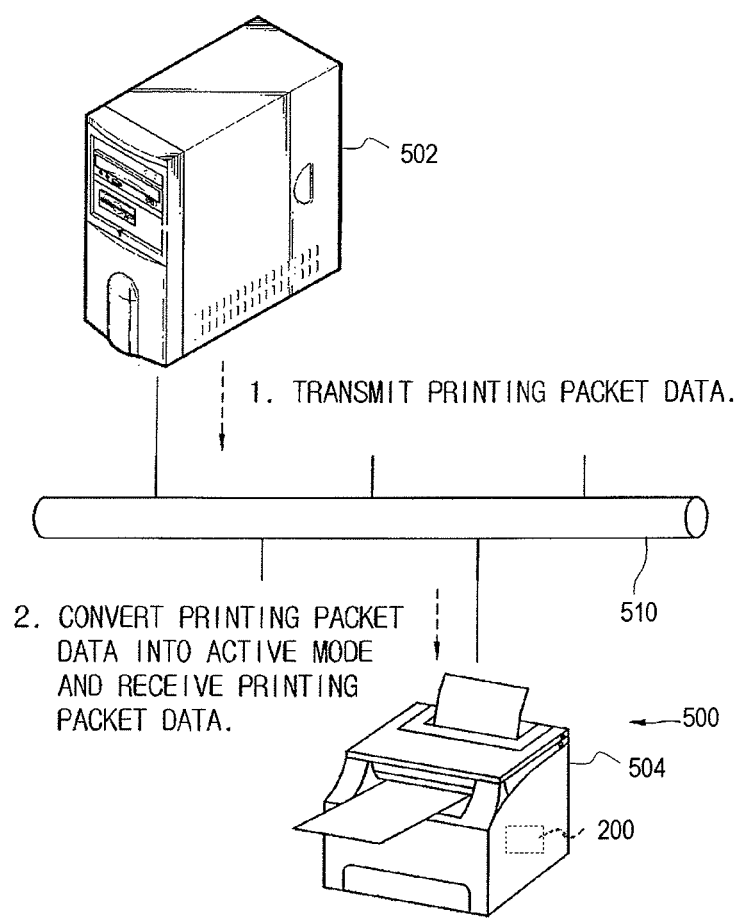

FIGS. 5A and 5B are block diagrams to illustrate operation of an exemplary network device, in particular, a network printer 500 embodying aspects of the present general inventive concept. As is illustrated in the FIGS. 5A-5B, a user's computing device 502 is connected to the network printer 500 through a communication network 510. For purposes of explanation and not limitation, the exemplary communication network will be an Ethernet implementation of a local area network operating under the TCP/IP Internet protocol suite. The network printer 500 includes a printing engine 504, which includes all of the hardware and software for printing indicia one or more pages of printable media, and a network interface card 200 implementation of the present general inventive concept, such as is described above. It should be apparent to the skilled artisan that other network devices may be used with the present general inventive concept, where the printing engine 504 would be replaced with the hardware and software implementing the applicable network device.

The sleep-mode firmware of the exemplary interface card 200 in the network printer 500 includes protocol modules which may be operated in the sleep mode. For example, the sleep-mode firmware includes a discovery protocol module, such as for processing broadcast or multicast discovery packets transmitted by external devices when searching for a network printer on the network, a packet analyzing module and an active mode converting module.

FIG. 5A illustrates operation to process the packet data if the host computing device 502 transmits broadcast or multicast discovery packets while the interface card 200 in the network printer 500 is in the sleep mode. Responsive to the transmitter-receiver 212 of the interface card 200 receiving packet data of any type, the packet analyzing module determines whether the packet data belongs to a set of packet data that can be processed in the sleep mode. In the case where discovery packet data are in the set of packet data that can be processed in the sleep mode, the exemplary embodiment determines that it is possible to process the discovery packet data in the sleep mode, and the discovery protocol module is executed to process the discovery packet data. In accordance with the exemplary embodiment, the discovery protocol module generates respondent packet data to be transmitted through the network 510 to the host 502 so that the user thereat can operate the network printing apparatus 500 to print.

FIG. 5B illustrates operations to process the packet data if the host 504 transmits printing packet data to print in the sleep mode of the interface card 200 of the exemplary network printer 500.

If the transmitter-receiver 212 of the interface card 200 receives the printing packet data, the packet analyzing module determines whether the packet data can be processed in the sleep mode. However, in this case, the printing packet data cannot be processed in the sleep mode and the network printer 500 transitions from the sleep mode into the active mode, such as through the exemplary processes described above. Once in the active mode, the printer prints the received printing packet data.

As described above, the present general inventive concept can reduce power consumption in a sleep mode over other interface cards of the prior art.

Further, the present general inventive concept can avoid spending unnecessary time to transition into an active mode and to load active mode instruction code whenever a packet must be processed, in that the general inventive concept allows some packet data to be processed in the sleep mode.

Although a few embodiments of the present general inventive concept have been shown and described, it will be appreciated by those skilled in the art that changes may be made in these embodiments without departing from the principles and spirit of the general inventive concept, the scope of which is not defined by the descriptions above, but by the appended claims and their full range of equivalents.

What is claimed is:

1. An image forming apparatus comprising:
a printing engine; and
a network interface unit coupled to the printing engine and capable of transitioning between a sleep mode and an active mode, the network interface unit including a transmitter-receiver to transmit output packet data to an external device and to receive input packet data from the external device, a MAC controller to process input packet data received via the transmitter-receiver, and a processor to process input packet data forwarded from the MAC controller, including printing packet data,
wherein, if the input packet data received via the transmitter-receiver during the sleep mode is at least one of multicast packet data and broadcast packet data and the received packet data can be processed by the network interface unit without transitioning to the active mode, the network interface unit generates a respondent packet data in response to the received packet data and transmits the respondent packet data via the transmitter-receiver without transitioning to the active mode,
if the input packet data received via the transmitter-receiver during the sleep mode is printing packet data, the network interface unit transitions from the sleep mode to the active mode to enable the processor to process the printing packet data.

2. The image forming apparatus according to claim 1, wherein the received packet data which is the at least one of multicast packet data and broadcast packet data that can be processed by the network interface unit during the sleep mode comprises discovery packet data, and network interface unit is configured to generate a respondent packet data in response to the received discovery packet data and the transmit the respondent packet data without transitioning to the active mode.

3. The image forming apparatus according to claim 1, wherein the printing engine executes printing according to the printing packet data processed by the processor.

4. A method of controlling an image forming apparatus having a network interface and a printing engine, the method comprising:
generating a respondent packet data in response to at least one of multicast packet data and broadcast packet data received by the network interface and transmitting the respondent packet data via the network interface that is coupled with the printing engine without transitioning the network interface to an active mode when an input packet data received and processed via a MAC controller of the network interface during a sleep mode is the at least one of multicast packet data and broadcast packet data; and
transitioning the network interface that is coupled with the printing engine from the sleep mode to the active mode to process a printing packet data that is forwarded from the MAC controller with a processor of the image forming apparatus when the input packet data received via the network interface when in the sleep mode is printing packet data.

5. A printing apparatus connectable to a network, the printing apparatus comprising:
a printing engine; and
a transmitter-receiver to transmit packet data to an external device and to receive packet data from the external device via the network,
the printing apparatus being operable in an active mode, a partial sleep mode during which less power is consumed than in the active mode and a complete sleep mode during which less power is consumed than in the partial sleep mode,
if no packet data is transmitted from the external device via the network for a predetermined period of time when the printing apparatus is in the active mode, the printing apparatus transitions to the complete sleep mode,
if the packet data received via the transmitter-receiver from the network in the complete sleep mode is a multicast packet data, a respondent packet data is transmitted via the transmitter-receiver to the network without transitioning from the complete sleep mode to the partial sleep mode in response to the received multicast packet data, and
if the packet data received via the transmitter-receiver from the network in the complete sleep mode is printing packet data, the printing apparatus transitions from the complete sleep mode to the active mode and the printing engine performs a printing operation in the active mode.

6. The printing apparatus of claim 5, wherein active-mode instruction code is executed during the partial sleep mode, and
additional power consumption reduction is achieved in the complete sleep mode by executing sleep-mode instruction code instead of the active-mode instruction code.

7. The printing apparatus of claim 5, further comprising:
- at least one memory to store an active mode firmware and a sleep mode firmware; and
- a controller to process the received packet in the active mode by executing the active mode firmware when it is determined that the sleep mode firmware is unable to process the packet received during sleep mode.

8. The printing apparatus of claim 5, wherein the received packet data that can be processed by the transmitter-receiver during the sleep mode is a discovery packet data, and the transmitter-receiver generates a respondent packet data in response to the received discovery packet data and transmits the respondent packet data without transitioning to the active mode.

* * * * *